US008806689B2

(12) United States Patent
Riviere et al.

(10) Patent No.: US 8,806,689 B2
(45) Date of Patent: Aug. 19, 2014

(54) LOADING BAY SAFETY DEVICE AND PROCESS FOR OPERATING THE DEVICE

(75) Inventors: Olivier Riviere, Tremouille (FR); Fernando Gomes, Chevalles (FR); Nicolas Dupoux, Maurepas (FR); Yannick Michon, Saint Arnoult en Yelines (FR)

(73) Assignee: Assa Abloy Entrance Systems AB, Landskrona (SE)

( * ) Notice: Subject to any disclaimer, the term of this patent is extended or adjusted under 35 U.S.C. 154(b) by 0 days.

(21) Appl. No.: 13/995,392

(22) PCT Filed: Dec. 20, 2011

(86) PCT No.: PCT/EP2011/073365
§ 371 (c)(1),
(2), (4) Date: Aug. 2, 2013

(87) PCT Pub. No.: WO2012/084919
PCT Pub. Date: Jun. 28, 2012

(65) Prior Publication Data
US 2013/0312205 A1 Nov. 28, 2013

(30) Foreign Application Priority Data
Dec. 20, 2010 (EP) .................................... 10306461

(51) Int. Cl.
*E01D 18/00* (2006.01)
*B65G 69/28* (2006.01)
*A61G 3/06* (2006.01)
*E01F 9/07* (2006.01)

(52) U.S. Cl.
CPC ............ *B65G 69/2882* (2013.01); *A61G 3/061* (2013.01); *E01F 9/073* (2013.01)
USPC .................... 14/69.5; 14/71.1; 404/6; 404/11

(58) Field of Classification Search
CPC ...... E01F 9/073; B65G 69/2882; A61G 3/061
USPC .............................. 404/6, 9, 11; 14/69.5, 71.1
See application file for complete search history.

(56) References Cited

U.S. PATENT DOCUMENTS 5,212,846 A * 5/1993 Hahn ............................. 14/69.5
6,676,360 B2 * 1/2004 Springer et al. .............. 414/401

(Continued)

FOREIGN PATENT DOCUMENTS

EP 2 206 664 A 7/2010
WO WO 2009/070509 A 6/2009

*Primary Examiner* — Raymond W Addie
(74) *Attorney, Agent, or Firm* — Frommer Lawrence & Haug LLP; Ronald R. Santucci (57) ABSTRACT

The invention relates to a bay loading safety device including: —an articulated platform (14), whose level can be altered to adapt to the differences in height between a lorry trailer (10) and a loading bay (12), —a door (15) for shutting off access from (13) a building (11) opening onto the bay (12), —a set of buffers (16a, 16b) fixed on either side of the platform (14) to provide protection for the bay (12) when the lorry trailer (10) comes alongside the said bay (12), characterized in that it comprises, —a sensor (31) able to monitor a zone (34), called the crush zone, —a sensor (36) able to determine the distance of the lorry (10) from the bay (12), —an obstacle (35) that can be retracted during the travel of a lorry (10), so as to prevent it from coming alongside the bay (12) depending on whether the whole or part of a fixed or mobile object (17) situated in that zone (34) is present and on the distance of the lorry (10) from the bay (12).

19 Claims, 5 Drawing Sheets

(56) References Cited

U.S. PATENT DOCUMENTS

| | | | |
|---|---|---|---|
| 7,249,926 B1 * | 7/2007 | Mayer et al. | 414/401 |
| 7,264,092 B2 * | 9/2007 | Jette | 188/36 |
| 7,274,300 B2 * | 9/2007 | Duvernell et al. | 340/686.6 |
| 8,497,761 B2 * | 7/2013 | McNeill et al. | 340/5.7 |
| 8,547,234 B2 * | 10/2013 | Maly et al. | 340/573.1 |
| 8,616,826 B2 * | 12/2013 | Cotton et al. | 414/809 |

* cited by examiner

Fig. 1

PRIOR ART

60 = Determining distance of lorry
61 = Distance of lorry > safety zone ?
62 = Obstacle in safety and/or crush zone ?
63 = Red light
64 = Green light
65 = Safety zone > distance of lorry > retractable obstacle ?
66 = Obstacle in safety zone ?
67 = Red light
68 = Obstacle in crush zone ?
69 = -Activation of retractable obstacle
    -Red light
70 = Withdrawal of retractable obstacle
71 = Retractable obstacle > distance of lorry > 0 ?
72 = Obstacle in safety and/or crush zone ?
73 = Red Light + sound signal
74 = Green light or orange light
75 = Distance of lorry $\simeq$ 0 ?
76 = Red light
80 = Closed door ?
81 = De-activation of locking mechanism
82 = Partial opening of door up to Height limit H
83 = Deployment of the lip up to junction with the trailer
84 = Cover of the trailer for the lip with a distance $\geq$ Distance limit D ?
85 = Complete opening of door
90 = Closure of door ?
91 = Activation of locking mechanism
92 = Withdrawal of lip up to rest position
93 = Complete closure of door

Fig. 4b

LOADING BAY SAFETY DEVICE AND PROCESS FOR OPERATING THE DEVICE

This application is a 371 of PCT/EP2011/073365 filed on Dec. 20, 2011, published on Jun. 28, 2012 under publication number WO 2012/084919, which claims priority benefits from European Patent Application Number 10306461.4 filed Dec. 20, 2010, the disclosure of which is incorporated herein by reference.

The present invention relates to a loading bay safety device and a process for operating the device. In particular, the purpose of the invention is to provide a process and a device for implementing the process, avoiding any risk of pedestrians near the goods loading bay being crushed by lorries.

Using the technique, goods are transferred from a lorry trailer 10 to a building 11 or vice-versa from a loading or trans-shipment bay 12. A loading or trans-shipment bay 12 means a bay 12 usually in concrete acting as an interface between a building 11 or a warehouse access 13 and the outside, so as to facilitate loading or unloading of the lorry trailer 10.

Figure 1:
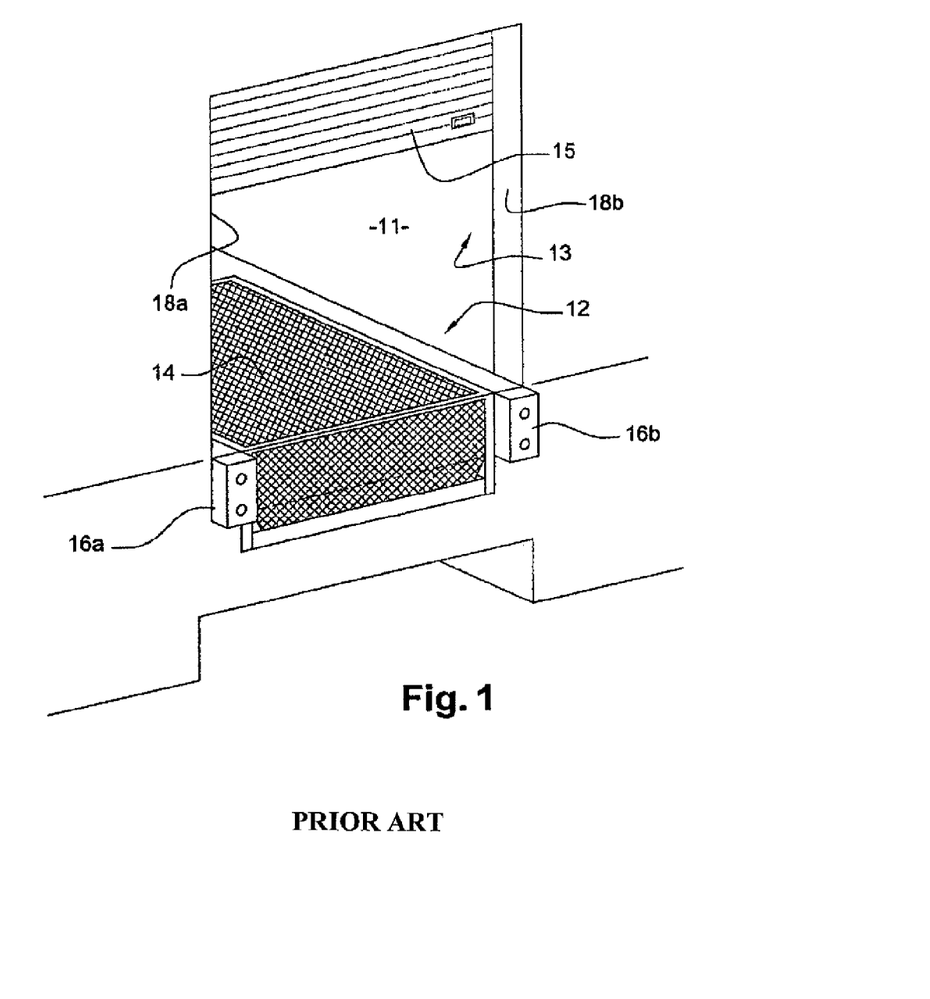
FIG. 1: A schematic representation of a loading bay using current technology (already described)

As shown in FIG. 1, a bay 12 mainly includes:
an articulated platform 14, able to be set at various levels so as to adapt to differences in height between the lorry trailer 10 and the loading bay 12;
a door 15 to shut off access 13 from the building 11 opening onto the bay 12;
a set of buffers 16a, 16b fixed on either side of the platform 14 to protect the bay 12 when the lorry trailer 10 draws alongside the said bay 12.

However, the current design of the bays 12 may expose personnel 17 working in the bays 12 and the drivers (not shown) to serious risks or even fatalities. In fact, as explained in FIGS. 2a to 2e, circumstances do exist that can cause accidents involving serious risks.

Figure 2A:
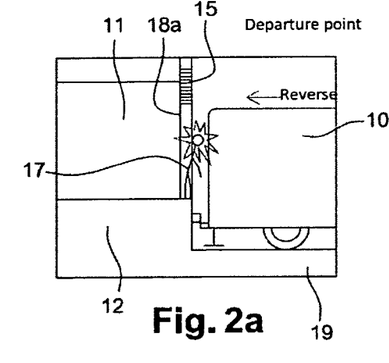
FIGS. 2a-2e: Schematic representations of various accidents that can occur near to a loading bay according to current technology (already described)

In the case illustrated in FIG. 2a, a pedestrian 17 working on the bay 12 has his head crushed between the uprights 18a, 18b of the door 15 of the bay 12 and the lorry trailer 10 when the latter is reversing to come alongside the bay 12.

Figure 2B:
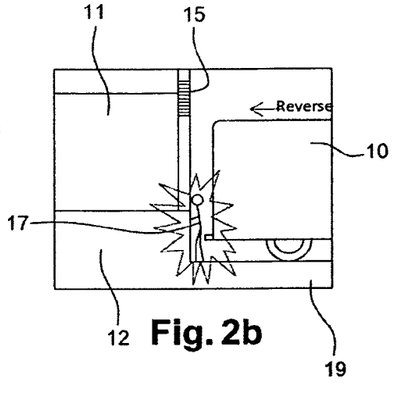

In the case illustrated in FIG. 2b, a pedestrian 17 working on the ground 19, between the bay 12 and the lorry trailer 10, is crushed when the said trailer 10 is reversing to come alongside the bay.

Figure 2C:
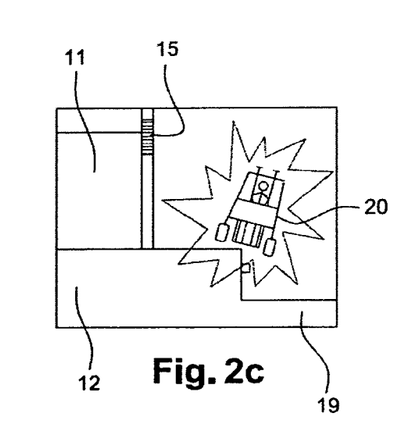

In the case illustrated in FIG. 2c, a fork lift truck operator 17 driving on the bay 12 outside is crushed following the overturn of his vehicle 20.

Figure 2D:
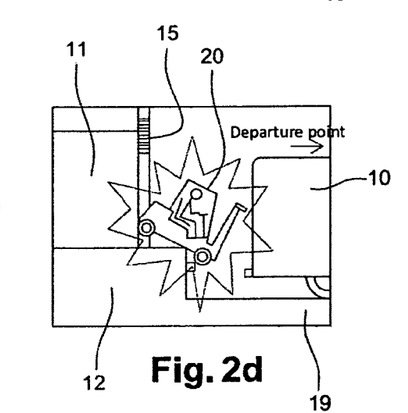

In the case illustrated in FIG. 2d, a fork lift truck operator 17 is crushed following the frontal overturn of his vehicle 20 driving on the bay 12, further to the untimely departure of the lorry 10 on which he was working.

Figure 2E:
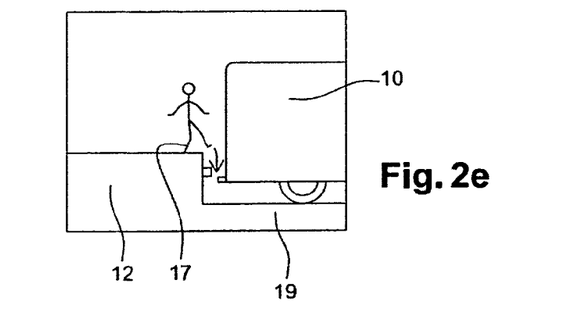

In the case illustrated in FIG. 2e, a pedestrian 17, working on bay 12 falls into the space between the bay and lorry 10 before the lip of the docking leveller is deployed or after it is retracted.

Because of often dramatic accidents that have occurred in recent years, there is greater awareness among the main manufacturers and clients concerned about the conditions of work of their employees. However, at the present time it is difficult to improve the safety conditions of a loading bay in the knowledge that this inevitably involves exorbitant cost.

The purpose of the invention is to meet this need whilst getting rid of the inconveniences in the technology. To do this, the invention proposes a loading bay safety device to protect personnel working near a loading bay.

Therefore, the invention's purpose is a loading bay safety device including:
an articulated platform whose level can be changed to equalise the difference in height between the trailer of a lorry and a loading bay.
a door to close off access from a building opening onto the bay,
a stop mean fixed on either side of the platform to ensure protection of the bay when the lorry trailer comes alongside the bay,
and characterised by having,
a sensor for monitoring the zone known as the crush zone,
a sensor for determining the distance between the lorry and the bay,
a retractable obstacle that can be activated during the lorry's travel so as to prevent the lorry from coming alongside the bay depending on the presence or otherwise of all or part of a fixed or mobile object situated in the zone and on the distance of the lorry from the bay.

The invention also has the following characteristics:
a sensor for monitoring the crush zone that is also able to monitor a safety zone, with the said crush zone being situated inside the safety zone;
a crush zone situated near to and between the two buffers;
a system of luminous and/or sound signs that can be activated depending on the presence or otherwise of all or part of a fixed or mobile object situated in the zone and on the distance of a lorry from the bay;
a sensor for monitoring the crush and safety zones which detects the presence of an object in the safety and/or crush zone depending on the volume of the said object;
the platform level can be changed by an actuator;
the platform has a lip that can be deployed to join the lorry trailer and the said platform;
a sensor situated under the lip of the platform that can detect any movement of the trailer in relation to the bay and in such an event a luminous signal or a sound signal is activated to prevent any risk being run by people and to stop trans-shipment operations;
the retractable obstacle is a marker;
the retractable obstacle is a barrier that can be lifted up;
the retractable obstacle is a wheel blocking system for blocking the lorry when alongside the bay and preventing it from leaving at the end of the trans-shipment;
a method for locking the manual or motorised door and configured in such a way as to allow partial opening of the said door up to a pre-determined height while the lip is not fully deployed on the lorry trailer;
a sensor situated on the door uprights to determine whether the partial opening of the door has reached the pre-determined height.

The purpose of the invention is also a process for operating the device according to the invention, including the following stages:
the distance of a lorry from the bay can be determined,
it can be determined whether the lorry is outside the safety zone,
the presence of an obstacle inside the safety zone can be determined,
the presence of an obstacle inside the crush zone can be determined.

The invention also has the following characteristics:
when the presence of an obstacle is detected in the safety zones and the crush zones, the luminous signal, preferably red, is activated;
when the distance of the lorry from the bay is between the safety zone and the retractable obstacle and the presence of an obstacle in the safety zone is detected, then the luminous signal, preferably red, is activated;

when the distance of the lorry from the bay is between the safety zone and the retractable obstacle and the presence of an obstacle is detected in the crush zone, the retractable obstacle and the luminous signal, preferably red, are activated, otherwise the retraction of the retractable obstacle is activated;

where the distance of the lorry from the bay is less than the distance between the bay and the retractable object, then it is determined whether an obstacle is detected in the safety and/or the crush zone;

where an obstacle is detected in these zone, then the luminous signal, preferably red, is activated as well as the sound signal.

A better understanding of the invention will be gained from reading the following description and examining the accompanying illustrations. These are only shown for illustrative purposes and are not restrictive with regard to the invention. The illustrations show.

In the description, the same numeric references in each illustration designate elements that are identical or operationally similar.

Figure 3:
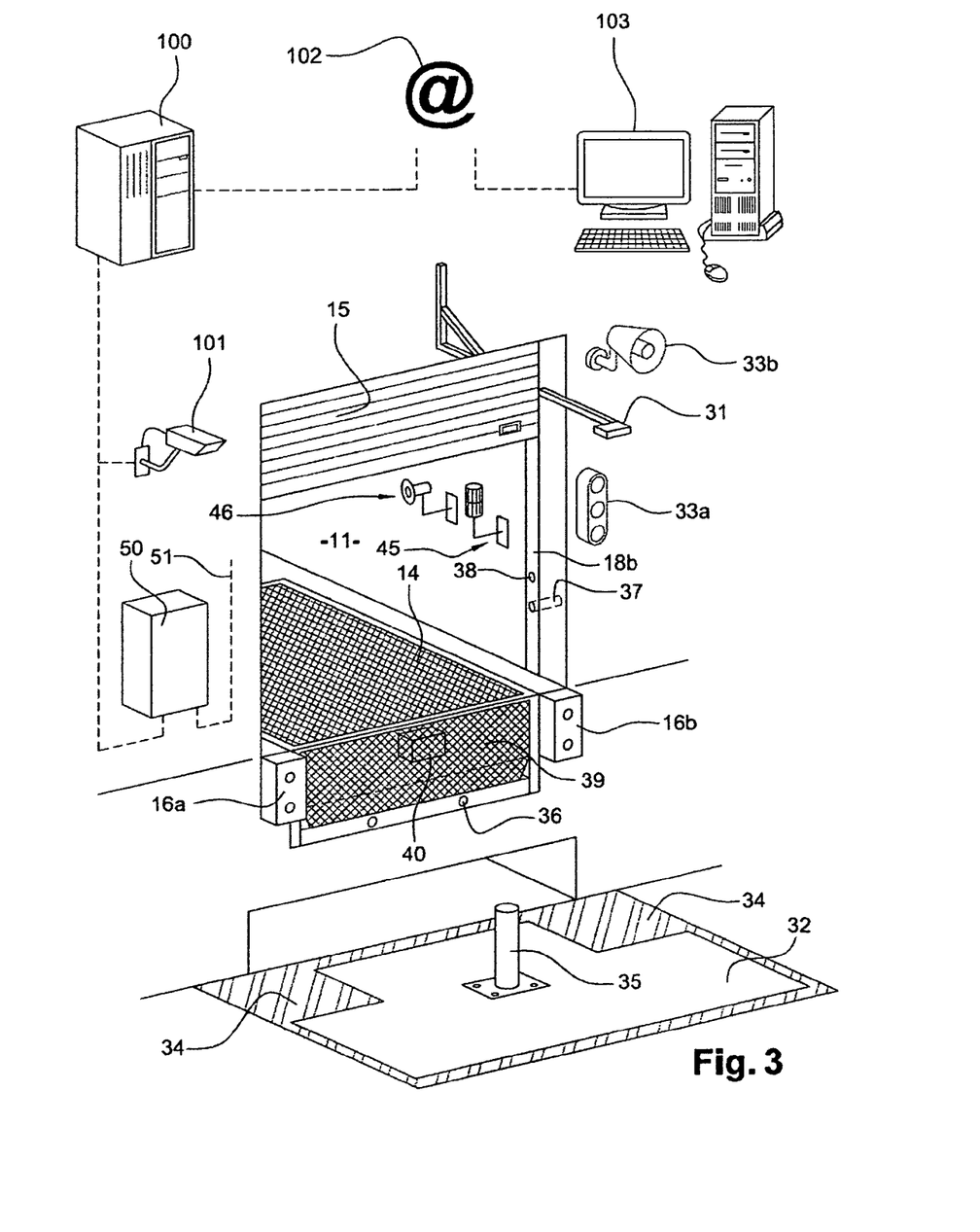
FIG. 3: A schematic representation of the loading bay safety device according to one embodiment of the invention.

FIG. 3 represents a loading bay 12 safety device 30. This device 30 has a set of electronic sensors implanted in various components of the loading bay 12. A first sensor 31 is placed so as to be able to monitor a safety zone 32. In one embodiment of the invention, this safety zone 32 represents a surface area of about 10 m2 situated in front of bay 12. The sensor 31 is able to detect the presence of a pedestrian 17 in this zone 32. The sensor 31 is also able to distinguish between one or more pedestrians 17 and a lorry 10, such that where the presence of a pedestrian 17 in the safety zone 32 is detected, a signalling system 33 is activated. In one embodiment of the invention, the signalling system 33 has a luminous signal 33a and/or a sound signal 33b.

The sensor 31 also allows monitoring of the crush zone 34. In one embodiment of the invention, this crush zone 34 represents a surface area of about 2 m2 to 3 m2 situated near each of the buffers 16a, 16b. The sensor 31 is able to detect the presence of a pedestrian 17 in the crush zone 31, so that where the presence of a pedestrian 17 in the zone 34 is detected, a retractable obstacle 35 is activated. In one embodiment of the invention, the obstacle 35 can be retracted during the travel of the lorry 10 so as to prevent the said lorry 10 from coming alongside the bay 12. The term 'retractable obstacle' 35 means any type of means able to stop the travel of a lorry 10 where a pedestrian 17 is found in the crush zone 34 and that can be retracted or folded away where no presence is detected. So, a retractable marker or barrier that can be lifted may be regarded as obstacles of this kind, although this example is not exhaustive.

In one variant for producing the invention, the presence of a pedestrian in the zone 32 and the zone 34 may be detected by two separate sensors.

The device 30 in the invention also includes a series of sensors 36 situated to the front of the bay 12, configured so as to detect the presence or otherwise of a lorry trailer 10.

In another embodiment of the invention, the sensor 31 may be in the façade whilst the sensor 36 is installed high up above the bay.

To ensure the safety of the personnel 17 working on the bay 12, the invention provides that where a lorry trailer 10 is not detected as being fully alongside the bay, the door 15 is mechanically kept shut by a locking mechanism 37. The purpose of this door locking mechanism is to prevent a person 17 coming from inside the building 11 from gaining access to the outside using the door 15, as illustrated in FIGS. 2a and 2c, when the lorry 10 is in the act of coming alongside, in other words until the retractable obstacle 35 has been fully lowered or deactivated.

Where the lorry trailer 10 is fully alongside the bay 12, the locking mechanism 37 is deactivated allowing partial opening of the door 15 up to a height predetermined by a sensor 38. In one embodiment of the invention, the predefined partial opening height of the door is about 600 mm. In the current technology, as there is a gap between the edge (not shown) of the lorry trailer 10 and the platform 14 that is appreciably greater than the thickness of the buffers 16a, 16b, the platforms are provided with means allowing them to be joined to the trailer. So, in one embodiment of the invention, there is a platform with a lip 39 that can be articulated by actuators (not shown). In another embodiment of the invention, there is a platform 14 with a telescopic lip to ensure attachment to the trailer 14. The main interest here of partial opening of the door 15 is allowing the lip to be used to join the platform 14 with the lorry trailer 10 whilst preventing a person 17 from falling from the bay 12, as in the cases illustrated in FIGS. 2d and 2e.

The invention also has a sensor 40 positioned under the lip 39, configured so that the lip 39 of the platform 14 is deployed and covers the rear of the trailer with a minimum predefined value, whilst the door 15 continues its opening phase and a luminous signal 45 is activated, for example in green, thereby allowing loading and/or unloading in complete safety. In one method of the invention, the minimum predefined lip cover value is 100 mm throughout the loading or unloading, with the sensor 40 controlling the value of the cover. If this is reduced following repeated movements of the lorry below a safety value, for example 50 mm, a warning mechanism 46 is set off, such as a red light or a siren or a flash, etc., indicating the risk in continuing with the trans-shipment.

The various parts described above of the device in the invention are controlled by a control unit 50. This control unit has a programme memory and a data memory connected to a microprocessor via a communication bus port (not shown). The control unit is connected to the various parts 14, 15, 31, 33a, 33b, 35, 36, 37, 38, 39, 40, 45, 46 through another communication bus 51.

The control unit 50 also has an input/output interface (not shown) connecting the communication buses.

The actions carried out by the control unit 50 are organised by the microprocessor. In response to the instruction codes recorded in the programme memory, the microprocessor produces orders for the various parts of the device 30 in the invention.

For this purpose, the programme memory has several programme zones corresponding to a series of stages.

Figure 4A:
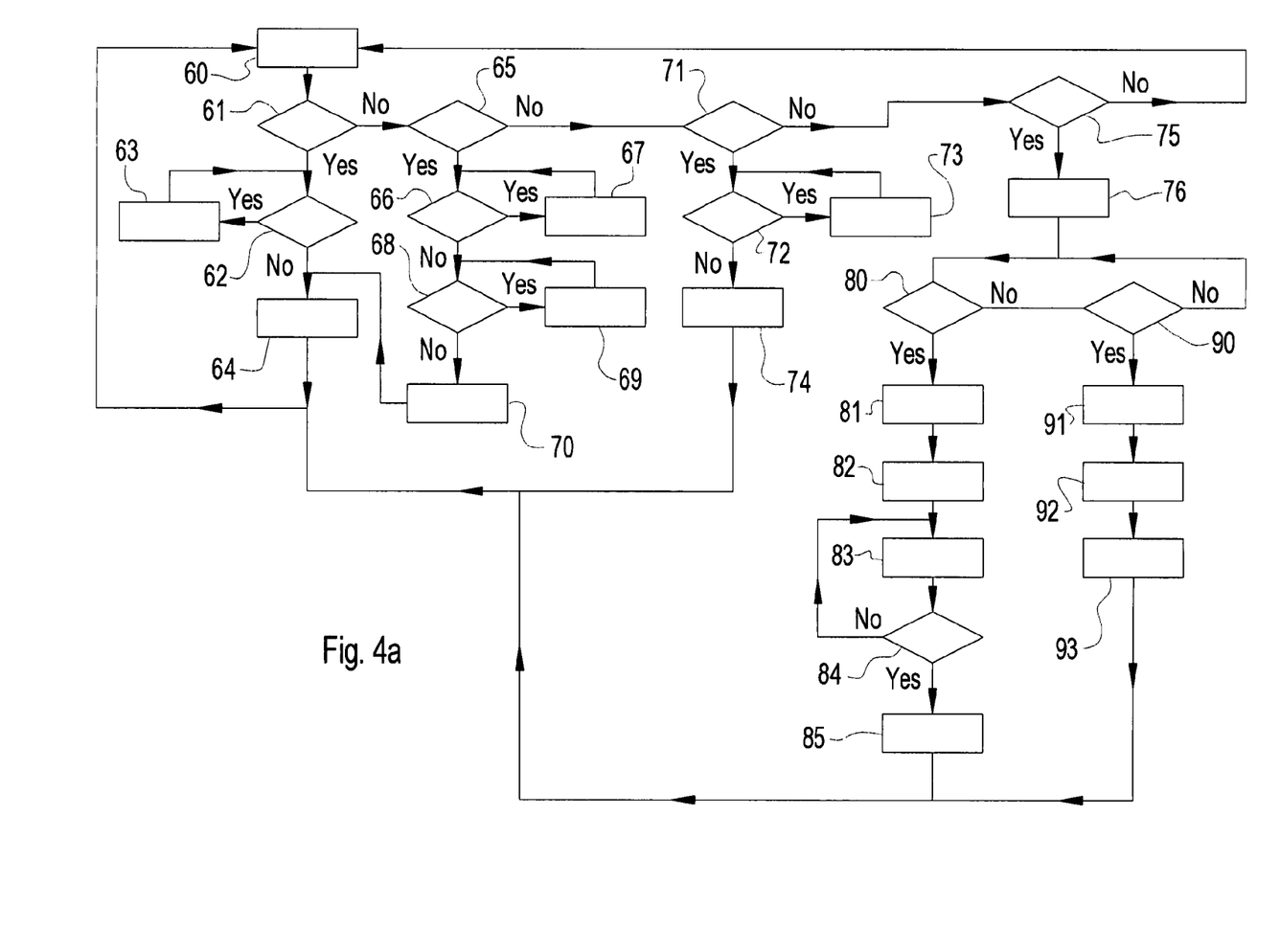
FIG. 4: A diagram of the process for operating the loading bay safety device, according to one embodiment of the invention.
Figure 4B:
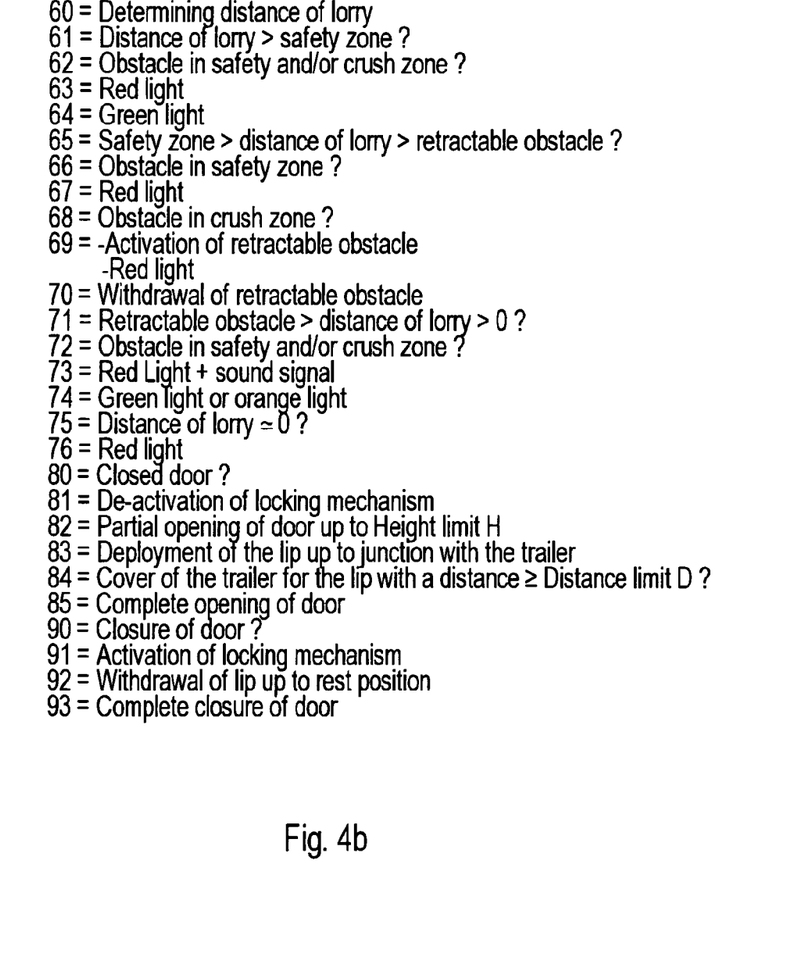

FIG. 4 is an example of a functional diagram of the process using one embodiment of the invention.

The goods trans-shipment cycle is started by allocating a bay 12 to a lorry 10. In the example given in FIG. 3, access to the bay 12 is previously closed by the door 15 and the personnel 17 assigned to work on the bay 12 wait inside the building 11. The lorry driver manoeuvres the lorry so as to get into position in a stage of reversal towards the bay 12. This stage is crucial as the driver of the lorry 10 cannot have a precise view from his cabin of the immediate environs of the bay 12 and can even crush a person 17 without realising it.

In the examples given in the description, we are mainly talking about pedestrians, persons, personnel or fork lift truck operators shown 17 in the illustrations, all chosen for the unforeseeable character of their reactions when faced with danger. But these examples are also applicable to all kinds of obstacles such as packages or palettes of goods for example.

At stage 60, the control unit 50 determines the distance between the bay and a lorry with this distance being determined by the sensor 36. At stage 61, the control unit 50 determines whether the lorry 10 is outside the safety zone 32. If the lorry 10 is outside the safety zone 32 then, at stage 62, the control unit 50 determines by means of the sensor 31 whether an obstacle 17 is inside the safety zone 32 and/or the crush zone 34. If the control unit 50 detects the presence of an obstacle in these zones 32, 34, then at stage 63, it activates the luminous signal 33, preferably red. If no obstacle 17 is detected in these zones 32, 34, then the control unit activates the luminous signal 33a, preferably green.

At stage 65, the control unit 50 determines whether the distance of the lorry 10 from the bay 12 is between the safety zone 32 and the retractable obstacle 35. If the control unit 50 detects the presence of an obstacle 17 in the safety zone 32 then at stage 67, the control unit activates the luminous signal 33a, preferably red. If no obstacle 17 is detected in the safety zone 32, then at stage 68 the control unit 50 determines whether the presence of an obstacle 17 is detected in the crush zone 34. If an obstacle 17 is detected in the crush zone 34 then at stage 69 the control unit 50 activates the retractable obstacle 35 and the luminous signal 33a, preferably red. If no obstacle 17 is detected in the crush zone 34 then at stage 70 the control unit 50 activates the retraction of the retractable obstacle 35.

At stage 71, the control unit 50 determines whether the distance of the lorry 10 from the bay 12 is less than the distance between the bay 12 and the retractable obstacle 35. If the distance of the lorry from the bay falls within this interval, then the control unit 50 determines at stage 72 whether an obstacle 17 is detected in the safety zone 32 and/or the crush zone 34. If an obstacle is detected in these zones 32, 34, then at stage 73 the control unit 50 activates the luminous signal 33a, preferably red, as well as the sound signal 33b. In another embodiment of the invention, the sound signal 33b may be replaced by flashing warning lights. If no obstacle 17 is detected in the safety zone 32 and/or the crush zone 34, then at stage 74 the control unit 50 activates the luminous signal, preferably green or orange depending on the two-colour or three-colour method of the signal 33a.

At stage 75, the control unit 50 determines whether the lorry has actually arrived and is resting on the buffers 16a, 16b, then at stage 76 the control unit 50 activates the luminous signal 33a, preferably red, telling the driver to stop.

At stage 80, the control unit 50 determines whether the door 15 is closed. If the door 15 is shut, then at stage 81 the control unit 50 deactivates the locking mechanism 37 of the door 15. It is then possible to open the door 15 partially up to a height limit H. The opening of the door 15 may be opened manually or motorised as in stage 82. The height limit H allows the control unit to deploy a lip 39 of the platform 14 as in stage 83, without running the risk of a person 17 falling, as in FIGS. 2d and 2e, who are on the bay 12. In one embodiment of the invention, the height limit H is equal to about 600 mm.

At stage 84, the control unit 50 determines the distance limit, D, of coverage by the lip of the rear of the lorry trailer 10. Where the lip 39 has been deployed so as to position it for coverage of the rear of the lorry trailer 10 by a distance limit of about D, then stage 85 on opening the door 15 may be continued in full and the signal 45 lit up in green indicating that the trans-shipment may begin. In one embodiment of the invention, the distance limit D is also about equal to 100 mm.

Throughout the period of trans-shipment, the distance limit D is monitored. If it falls below the distance limit D [by] 50 mm, the luminous red signal 45 is activated to give a warning of the risk and to stop the trans-shipment operations.

At a stage 90, the control unit 50 determines whether the closure of the door is required. Where the closure of the door 15 is initiated, for example because the trans-shipment has finished, the control unit 50 activates the detection mechanism 38 so as to control the closure of the door 15 up to the height limit H. At this stage, it is not possible to activate the retraction of the lip if the door is not at the height limit H.

At stage 92, the control unit activates the retraction of the lip 39 to its rest position.

At stage 93, the door 15 may be fully shut.

The lorry 10 may then go forward provided that there is no obstacle to the driver shutting the rear doors of the trailer before leaving the zone.

The device 30 in the invention may be adapted to any type of new or old bay.

Also, by connecting the control unit 50 to a web server 100, the invention allows monitoring of the condition of all the components of the device 30 in the invention. The monitoring may be added to by an IP [Internet protocol] camera 101. The web server 100 may also be connected to the Internet 102 so that from any client station 103 in the world and provided with an Internet connection it is possible, using a secure interface protected by a user name and password, to see the bay 12 in real time as well as monitor the condition of the sensors in the device 30.

The invention claimed is:

1. A loading bay safety device including:
   an articulated platform having a level that is alterable to adapt to the differences in height of a lorry trailer and a loading bay,
   a door to shut off access from a building opening onto the bay,
   a stop means fixed on either side of the platform to provide protection for the bay when the lorry trailer comes alongside the said bay,
   a first sensor able to monitor a crush zone,
   a second sensor able to determine the distance of the lorry from the bay,
   a retractable obstacle that can be activated during the travel of the lorry to prevent the lorry from coming alongside the bay depending on the presence or otherwise of the whole or part of a fixed or mobile object situated in the crush zone and on the distance of the lorry from the bay.

2. A device according to claim 1, wherein the first sensor is also able to monitor a safety zone, with the crush zone being situated inside the safety zone.

3. A device according to claim 2, wherein the crush zone is situated near and between a set of buffers fixed on either side of the platform to provide protection for the bay when the lorry is alongside the bay.

4. A device according to claim 2, comprising a system of luminous signals and or sound signals that can be activated depending on whether the whole or part of a fixed or mobile object situated in the safety zone is present and on within the distance of the lorry from the bay.

5. A device according to claim 2, wherein the first sensor detects the presence of at least one object in the safety zone and or the crush zone according to the volume of the said object.

6. A device according to claim 1, wherein the level of the platform is alterable by an actuator.

7. A device according to claim 1, wherein the platform comprises a lip that can be deployed to ensure the lorry trailer and the platform are joined together.

8. A device according to claim 7, wherein a third sensor is situated under the lip of the platform to detect movement of the lorry trailer in relation to the bay and, when movement of the lorry is detected, a luminous or sound signal is activated.

9. A device according to claim 1, wherein the retractable obstacle is a marker.

10. A device according to claim 1, wherein the retractable obstacle is a barrier that can be lifted.

11. A device according to claim 1, wherein the retractable obstacle is a wheel blocking system able to block the lorry when corning alongside the bay, or to prevent departure of the lorry.

12. A device according to claim 1, comprising a means of locking the door configured to allow partial opening of the said door up to a predetermined height provided that the lip is not completely deployed on the lorry trailer.

13. A device according to claim 12, comprising a fourth sensor situated on uprights of the door to determine whether the partial opening of the door has reached the predetermined height.

14. A process for operating the device according to claim 2 including the following steps:
   determining the distance of a lorry from the bay,
   determining whether the lorry is outside the safety zone,
   determining the presence of a fixed or mobile object inside the safety zone,
   determining the presence of a fixed mobile object inside the crush zone,
   wherein the retractable obstacle is activated to prevent the lorry from coming alongside the bay based on the determination of the presence of the fixed or mobile object in the safety zone and the presence of the fixed or mobile object in the crush zone.

15. A process according to claim 14, wherein if the presence of the fixed or mobile object in the safety zone or the crush zone is detected, then a luminous signal is activated.

16. A process according to claim 14, wherein if the distance of the lorry from the bay is between the safety zone and the retractable obstacle and the presence of the fixed or mobile object is detected in the safety zone, then the luminous signal is activated.

17. A process according to claim 16, wherein if the distance of the lorry from the bay is between the safety zone and the retractable obstacle and the presence of the fixed or mobile object is detected in the crush zone, then the retractable obstacle and the luminous signal is activated or the retraction of the retractable obstacle is activated.

18. A process according to claim 14, wherein if the distance of the lorry from the bay is less than the distance from the bay to the retractable obstacle, then it is determined whether the fixed or mobile object is detected in the safety zone and/or the crush zone.

19. A process according to claim 18, wherein if the fixed or mobile object is detected in safety and/or crush zone, then the luminous signal is activated together with the sound signal.

* * * * *